UNITED STATES PATENT OFFICE.

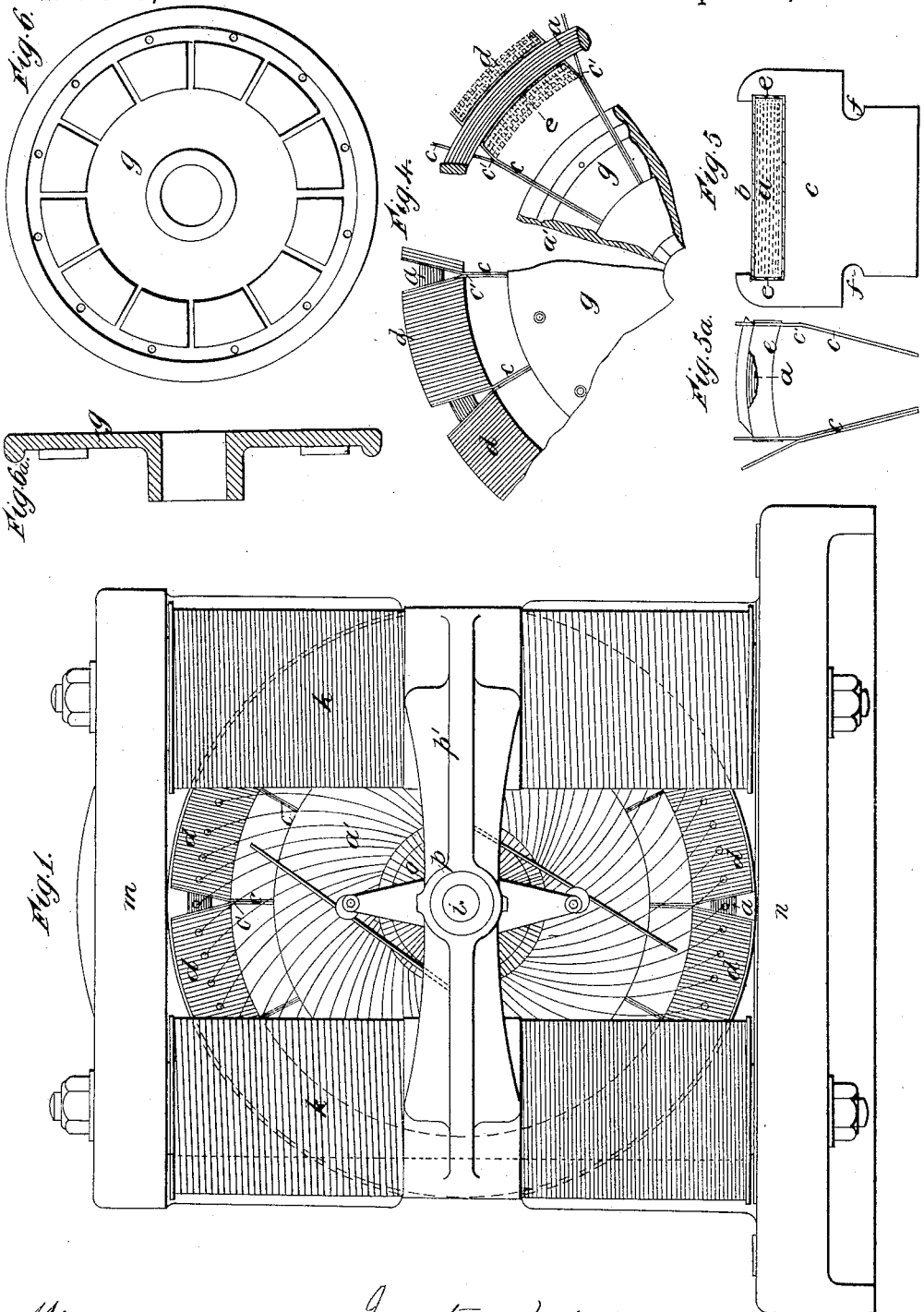

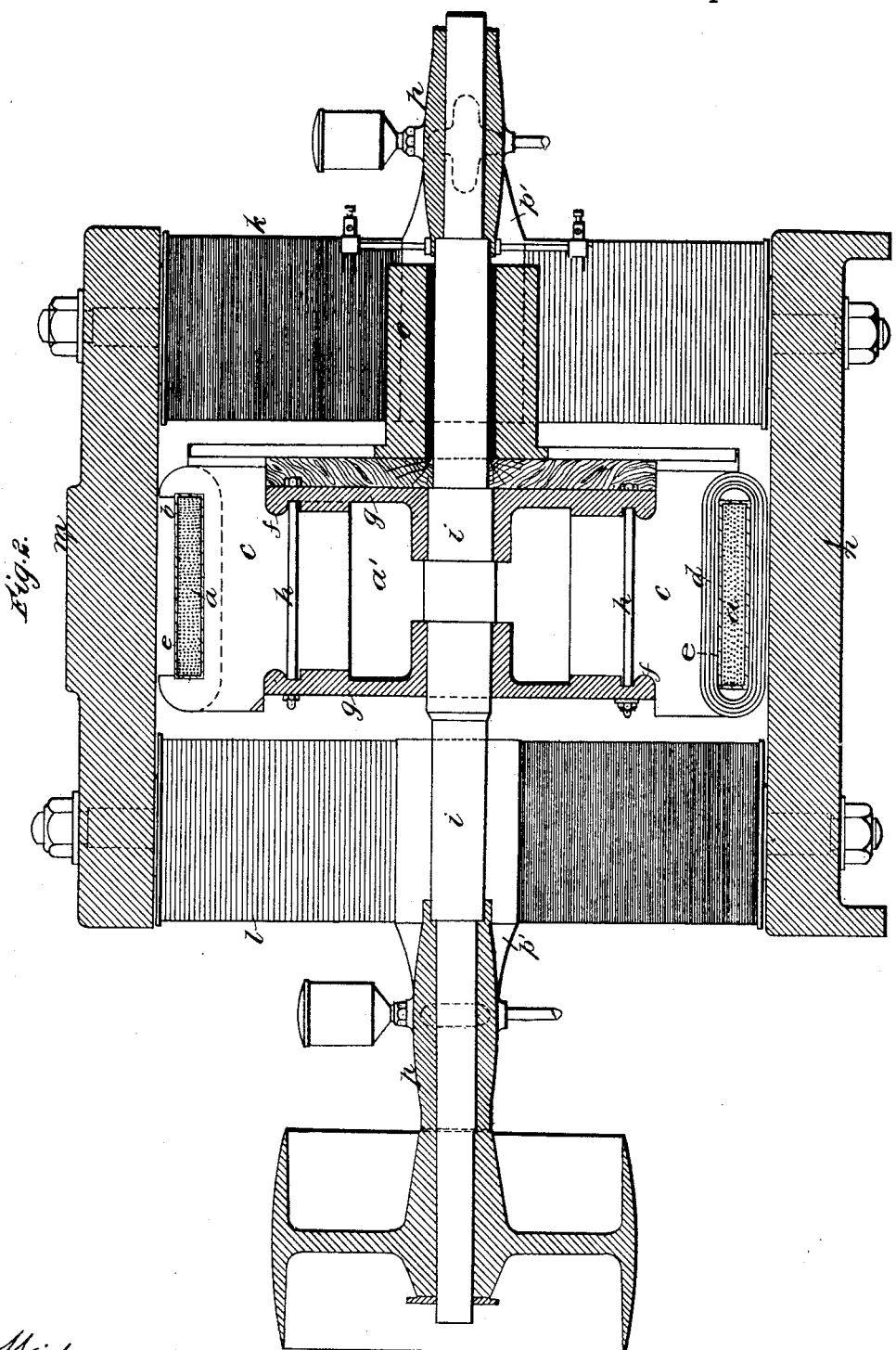

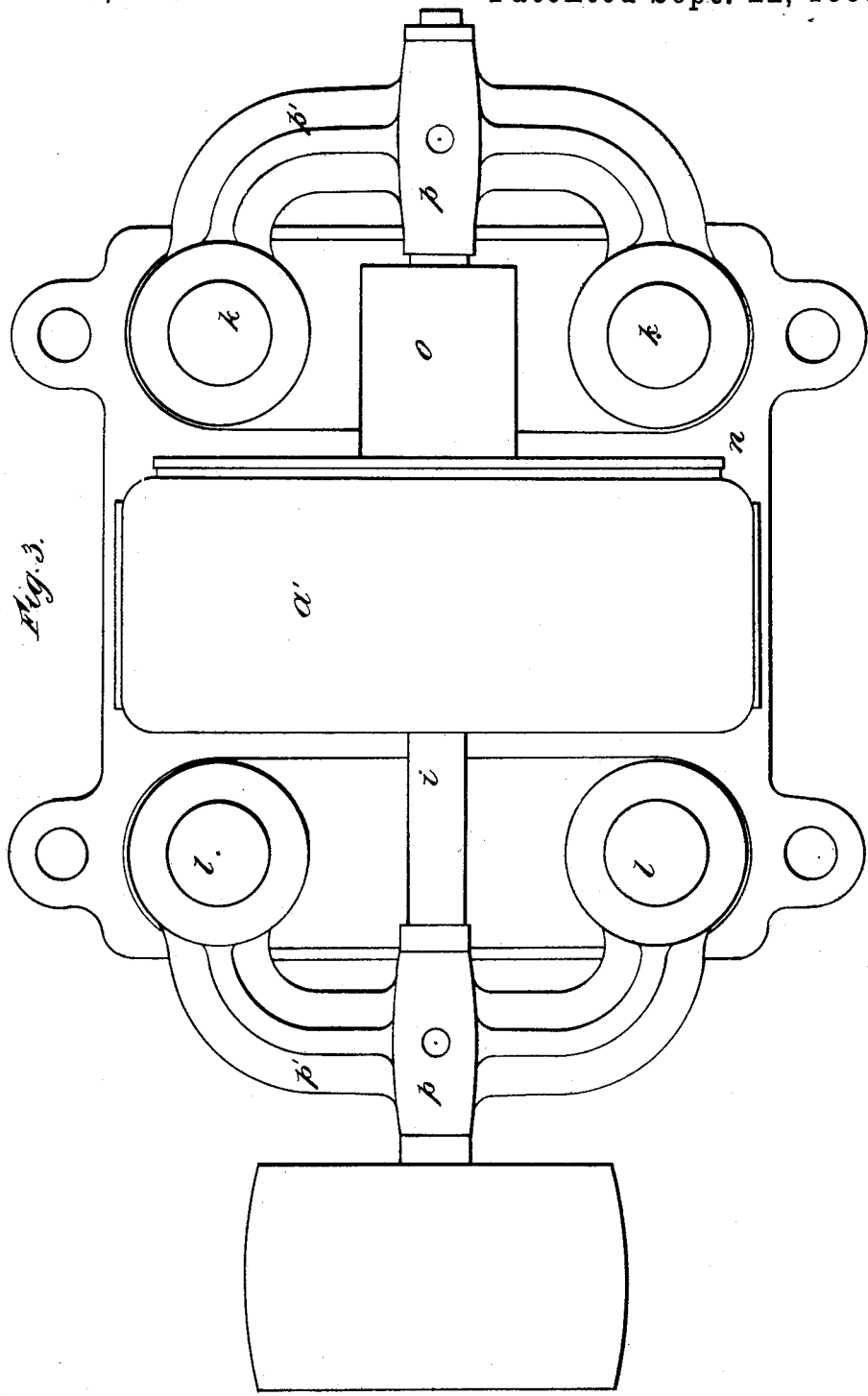

WILLEM BENJAMIN SMIT AND ADRIAAN POT, OF SLIKKERVEER, NETHERLANDS.

DYNAMO-ELECTRIC MACHINE.

SPECIFICATION forming part of Letters Patent No. 326,796, dated September 22, 1885.

Application filed January 9, 1885. (No model.)

*To all whom it may concern:*

Be it known that we, WILLEM BENJAMIN SMIT and ADRIAAN POT, subjects of the King of Holland, both residing at Slikkerveer, in the Kingdom of the Netherlands, have invented new and useful Improvements in Dynamo-Electric Machines, of which the following is a specification.

This invention relates to improvements in dynamo-electric machines, and has for its object the construction of an efficient dynamo in a simple, strong, and compact form.

In the accompanying three sheets of drawings, illustrating our improved construction of dynamo-electric machine, Figure 1 is an end view, and Fig. 2 a longitudinal section, of the same. Fig. 3 is a plan or top view of same with an upper pole-piece, hereinafter described, removed. Figs. 4, 5, 5ª, 6, and 6ª are detail views hereinafter referred to.

A dynamo-electric machine according to this invention has an annular or ring armature, the core $a$ of which is formed of iron wire wound upon itself into a flat ring, the said iron wire being wound upon and resting in grooves, recesses, or slots $b$, formed in a series of spokes or arms, $c$, to which the wire, when wound, is secured, as hereinafter described.

After the wire core or ring $a$ has been wound upon the spokes or arms $c$ it is connected to them by tin-plate connections in such manner that the portion of the core $a$ upon which armature-coils $d$ are to be subsequently wound is inclosed by a rectangular box, $e$, formed of tin-plate, the sides and ends of which are united together and to the arms or spokes $c$ in any convenient manner—as, for instance, by soldering. The two sides and bottom of the rectangular box $e$ may, if desired, be secured in position to the arms or spokes $c$ previous to the winding of the wire core thereon, the upper side of the said box being secured to the remaining sides of the box and arms or spokes after such winding is completed, securing the core $a$ to the spokes $c$. Upon the core $a$ thus formed and boxed in the armature-coils $d$ are wound, each coil being situated between two of the arms or spokes $c$ of the armature $a'$, (see Figs. 1 and 4,) which thus form flanges to the sides or ends of the coils. These arms or spokes $c$ consist each of a flat plate with a groove, recess, or slot, $b$, at one end, as shown in Fig. 5, in which the armature wire core $a$ is wound, as above stated, and with two depressions or indentations, $f$, in its outer edges, which are grasped by bosses or flanges $g$, Figs. 6 and 6ª, one on each side of the armature, by which they are united to form a strong and compact armature, the said bosses being secured together by the cross stays or bolts $h$, and to the armature-driving shaft $i$. Each arm, spoke, or plate is bent at the point $c'$, near to where it emerges from the bosses or flanges $g$, Figs. 1 and 4, so that the remainder or outer portion of it is not radial to the axis, but parallel to the sides or ends of an armature-coil.

The armature-coils $d$ may be of copper wires, bands, or bars, according to the dimensions and requirements of the machine.

$k\ k$ and $l\ l$ are two pairs of vertical field-magnets, between which the armature rotates, so arranged and wound that the upper poles of each are of the same polarity, and connected by an iron pole-piece, $m$, while their lower ends are all of opposite polarity and similarly connected by another iron pole, $n$, which also forms the base of the machine. The winding of the field-magnets may or may not be compound, according to the requirements of the machine. They are shown as compound wound in the drawings.

$o$ is the commutator, to which the armature-coils are connected in any suitable manner.

The armature-driving shaft $i$ is supported in bearings $p$ in the brackets $p'$, connected to the central or neutral portions of the field-magnets, as shown.

A machine thus constructed may be used either for the production of electrical energy or as a motor.

In constructing such a machine the arms or spokes $c$ are fixed between the disks, flanges, or bosses $g$ on the armature-driving shaft $i$, and the wire core $a$ is wound in the slots $b$ at their ends. The arms or spokes $c$ are then secured to the iron core $a$ by the tin-plate connections, in the manner hereinbefore described, and the armature-shaft $i$ and flanges or bosses $g$ withdrawn to facilitate the winding of the armature coils $d$. When these are complete, the armature-shaft and flanges or bosses are replaced and secured and the ends of the coils connected to the commutator.

What we claim is—

1. In a dynamo-electric machine, in combination with the armature-core, one or more boxes forming a channel for said core, and the spokes for supporting the core, the outer ends of which are connected by said boxes, substantially as described.

2. In a dynamo-electric machine, a ring-armature having arms or spokes $c$, in combination with the boxes $e$, the armature-core wound within said boxes upon said spokes, and armature-coils $d$, wound upon said boxes between said spokes, substantially as described.

3. In a dynamo-electric machine having a ring-armature, radial arms or spokes $c$, arranged in pairs, the upper portions of each pair being bent away from each other, substantially as shown, whereby the upper portions of opposite spokes in adjacent pairs are substantially parallel, and each spoke being formed with a recess, $b$, in its outer end, in combination with an armature-core, $a$, of iron wire wound upon said spokes within said recesses $b$, and armature-coils $d$, wound upon the core $a$ between the parallel portions of adjacent spokes, substantially as set forth.

4. In a dynamo-electric machine, a ring-armature having arms or spokes $c$, with recesses $f$ in their sides and recesses $b$ in their outer ends, in combination with the boxes $e$, the armature-core wound upon said spokes within the boxes $e$, and armature-coils $d$, wound upon said boxes, covering said core between said spokes, the whole being clamped together, substantially as described.

WILLEM BENJAMIN SMIT.
ADRIAAN POT.

Witnesses:
B. POT,
JOH. SMIT,
*Both of Slikkerveer, Holland.*